(12) United States Patent
Kishiyama et al.

(10) Patent No.: US 8,873,437 B2
(45) Date of Patent: Oct. 28, 2014

(54) BASE STATION APPARATUS AND METHOD IN MOBILE COMMUNICATION SYSTEM

(75) Inventors: Yoshihisa Kishiyama, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1273 days.

(21) Appl. No.: 12/597,324

(22) PCT Filed: Apr. 28, 2008

(86) PCT No.: PCT/JP2008/058214
§ 371 (c)(1), (2), (4) Date: Jan. 8, 2010

(87) PCT Pub. No.: WO2008/136469
PCT Pub. Date: Nov. 13, 2008

(65) Prior Publication Data
US 2010/0128675 A1    May 27, 2010

(30) Foreign Application Priority Data
May 1, 2007    (JP) .................................. 2007-121305

(51) Int. Cl.
H04B 7/00 (2006.01)
H04W 4/00 (2009.01)
H04L 5/00 (2006.01)
H04L 27/26 (2006.01)

(52) U.S. Cl.
CPC .......... *H04L 27/2601* (2013.01); *H04L 5/0053* (2013.01); *H04L 5/0044* (2013.01); *H04L 5/003* (2013.01); *H04L 5/0048* (2013.01); *H04L 5/0007* (2013.01)
USPC ............................ 370/310; 370/328; 370/338

(58) Field of Classification Search
USPC .......................................... 370/310, 328, 338
See application file for complete search history.

(56) References Cited

U.S. PATENT DOCUMENTS

| | | | |
|---|---|---|---|
| 2007/0217440 A1* | 9/2007 | Cho et al. ...................... | 370/431 |
| 2008/0192720 A1* | 8/2008 | Frederiksen et al. ......... | 370/344 |
| 2008/0212702 A1* | 9/2008 | Pan et al. ...................... | 375/260 |
| 2008/0273616 A1* | 11/2008 | Papasakellariou ............ | 375/260 |
| 2009/0156225 A1* | 6/2009 | Angelow et al. .............. | 455/450 |

OTHER PUBLICATIONS

International Search Report w/translation from PCT/JP2008/058214 dated Aug. 5, 2008 (5 pages).
Written Opinion from PCT/JP2008/058214 dated Aug. 5, 2008 (6 pages).

(Continued)

*Primary Examiner* — Noel Beharry
*Assistant Examiner* — Kodzovi Acolatse
(74) *Attorney, Agent, or Firm* — Osha Liang LLP (57) ABSTRACT

A base station apparatus in a mobile communication system allowing for user equipment terminals having different numbers of receiving antennas is disclosed. The base station apparatus includes a mapping unit mapping a reference signal, a primary broadcasting signal, a synchronization signal, and an L1/L2 control signal onto a predetermined signal format; and a transmission unit transmitting the mapped signals, in which, within a sub-frame, the mapping unit maps the L1/L2 control signal and the primary broadcasting signal so as to be time-domain multiplexed, maps the primary broadcasting signal and the synchronization signal within a predetermined bandwidth in a middle of a system bandwidth, maps a reference signal included in a predetermined transmission stream within the predetermined bandwidth, but does not map a reference signal included in a transmission stream other than the predetermined transmission stream within the predetermined bandwidth.

6 Claims, 10 Drawing Sheets

(56) References Cited

OTHER PUBLICATIONS

3GPP TSG RAN1 #47, R1-063461; "Further consideration on SCH/BCH transmission"; InterDigital; Riga, Latvia; Nov. 6-10, 2006 (4 pages).

3GPP TSG RAN WG1 #48bis, R1-071448; "Further Evaluation of Tx Diversity Schemes for P-BCH"; Nortel; St. Julian's, Malta; Mar. 26-30, 2007 (16 pages).

3GPP TSG RAN WG1 Meeting #46, R1-062218; "BCH time-frequency structure"; Samsung; Tallinn, Estonia; Aug. 28-Sep. 1, 2006 (8 pages).

3GPP TSG RAN WG1 Meeting #47bis, R1-070022; "Intra-and/or Inter-Sector Diversity Scheme for P-BCH using S-SCH"; ETRI; Sorrento, Italy; Jan. 15-19, 2007 (7 pages).

3GPP TSG RAN WG1 Meeting #48bis, R1-071515; "Reference Signal for P-BCH reception with enhancement techniques"; Toshiba Corporation; St. Julian, Malta; Mar. 26-30, 2007 (7 pages).

3GPP TS 36.211 V1.0.0; "Physical Channels and Modulation"; Mar. 2007 (30 pages).

3GPP TR 25.814 V7.0.0; "Physical layer aspects for evolved Universal Terrestrial Radio Access (UTRA)"; Jun. 2006 (126 pages).

3GPP TSG RAN WG Meeting #47bis, R1-070103; "Downlink L1/L2 Control Signaling Channel Structure: Coding"; Sorrento, Italy; Jan. 15-19, 2007 (17 pages).

* cited by examiner

BASE STATION APPARATUS AND METHOD IN MOBILE COMMUNICATION SYSTEM

TECHNICAL FIELD

The present invention generally relates to a technical field of mobile communications, and more particularly to a base station apparatus and a method in a mobile communication system.

BACKGROUND ART

A next-generation communication system of the W-CDMA (Wideband Code Division Multiple Access) system, HSDPA (High Speed Downlink Packet Access) system, HSUPA (High Speed Uplink Packet Access) system and the like, namely an LTE (Long Term Evolution) system has been studied by 3GPP ($3^{rd}$ Generation Partnership Project) which is a standards body of the W-CDMA. In the LTE system as a radio access system, an OFDM (Orthogonal Frequency Division Multiplexing) scheme and an SC-FDMA (Single-Carrier Frequency Division Multiple Access) scheme have been studied as prospective candidate schemes to be applied to the downlink communications system and the uplink communications system, respectively (see, for example, Non Patent Document 1).

The OFDM scheme is a multi-carrier transmission scheme in which a frequency band is divided into plural sub-carriers having narrower frequency bands, and data are mapped onto the sub-carriers. By closely and orthogonally arranging the sub-carriers along the frequency axis, faster transmission is expected to be achieved and the efficiency of using the frequency band is also expected to be improved.

The SC-FDMA scheme is a single carrier transmission scheme in which a frequency band is divided with respect to user equipment (hereinafter may be referred to as a user equipment (UE) terminal or a mobile station) in a manner so that different frequencies can be separately used among plural terminals (user equipment (UE) terminals); and as a result, interference between terminals may be easily and effectively reduced. Further, preferably, in the SC-FDMA scheme, a range of transmission power fluctuation may be made smaller; therefore, lower energy consumption of terminals may be achieved and a wider coverage area may also be obtained.

In both uplink and downlink of the LTE system, communications can be performed by allocating one or more resource blocks to the mobile station. More specifically, the resource blocks may be shared among plural mobile stations in the system. In the LTE system, the base station (hereinafter may be referred to as a base station apparatus) determines which resource blocks are to be allocated to which mobile station from among plural mobile stations with respect to each sub-frame having 1 ms period (this allocation process may be called Scheduling). The sub-frame may also be called a TTI (Transmission Timer Interval). In downlink, the base station apparatus transmits a shared channel using one or more resource blocks to the mobile station selected by the Scheduling. The shared channel is called a Physical Downlink Shared Channel (PDSCH). In uplink, the mobile station selected by the Scheduling transmits the shared channel using one or more resource blocks. This shared channel is called a Physical Uplink Shared Channel (PUSCH).

In a communication system using the shared channels, it is required to perform (report) Signaling designating which shared channel is allocated to which user equipment terminal. In the LTE system, a control channel used for the Signaling is called a Physical Downlink Control Channel (PDCCH) or a Downlink L1/L2 Control Channel (DL-L1/L2 Control Channel). The Physical Downlink Control Channel (PDCCH) may include information items such as Downlink Scheduling Information, Acknowledgement information (ACK/NACK), Uplink Scheduling Grant, an Overload Indicator, Transmission Power Control Command Bit and the like (see, for example, Non Patent Document 2).

The Downlink Scheduling Information and the Uplink Scheduling Grant correspond to the information on which the Signaling is to be performed (i.e., to be reported as Signaling (information)). The Downlink Scheduling Information includes the information of the shared channel in downlink. More specifically, the Downlink Scheduling Information includes allocation information of the Resource Blocks in downlink, identification information of the user equipment (UE) terminal (UE-ID), data size, a modulation scheme, information items indicating an HARQ (Hybrid Automatic Repeat reQuest) and the like. When a MIMO (Multi-Input Multi-Output) system or a multi-antenna system is applied, the Downlink Scheduling Information further includes the number of streams and the information of Precoding Vectors.

The Uplink Scheduling Grant includes information of the shared channel in uplink. More specifically, the Uplink Scheduling Grant includes allocation information of the Resources in uplink, the UE-ID, data size, modulation scheme, information of transmission power in uplink, information of a Demodulation Reference Signal in Uplink MIMO and the like.

In downlink, a Common Control Physical Channel (CCPCH) is also transmitted. The Common Control Physical Channel (CCPCH) typically includes a Broadcast Channel (BCH). The Broadcast Channel (BCH) transmitted via the Common Control Physical Channel (CCPCH) may be especially called a static Broadcast Channel or a Primary Broadcast Channel (P-BCH). This is because there are some other broadcast channels called a Dynamic Broadcast Channel (Dynamic part) and a Secondary Broadcast Channel (S-BCH). The Dynamic Broadcast Channel is mapped onto the Physical Downlink Shared Channel (PDSCH). In this case, the Downlink Scheduling Information for the Dynamic Broadcast Channel is transmitted via the Downlink L1/L2 control channel (DL-L1/L2 Control Channel).

An uplink control channel transmits a downlink Channel Quality Indicator (CQI), the Acknowledgement information with respect to the Physical Downlink Shared Channel (PDSCH) and the like. The Channel Quality Indicator (CQI) is used in, for example, the Scheduling process and an Adaptive Modulation and Coding Scheme (AMCS) with respect to the Physical Downlink Shared Channel (PDSCH).

Non Patent Document 1: 3GPP TR 25.814 (V7.0.0), "Physical layer Aspects for Evolved UTRA," June 2006

Non Patent Document 2: 3GPP R1-070103, Downlink L1/L2 Control Signaling Channel Structure: Coding

DISCLOSURE OF INVENTION

Problems to be Solved by the Invention

The MIMO system refers to a multi-antenna communication system capable of increasing the data rate and/or improving the receiving quality of the transmission signals by using plural antennas for the communications. In the MIMO system, a signal processing method to be applied may generally differ depending on the number of the antennas to be used for the communications. In a next-generation mobile communication system currently proposed, single-antenna, two-antenna, and four-antenna transmissions are proposed as the transmission from the base station apparatus, and two-antenna and four-antenna receptions are proposed as the reception in the base station apparatus; and single-antenna and two-antenna transmissions are proposed as the transmission from the user equipment (UE) terminal, and two-antenna and four-antenna receptions are proposed as the reception in the user equipment (UE) terminal. In a future mobile communication system, therefore, there may be plural possible combinations of the number of antennas of the user equipment terminal and the number of antennas of the base station apparatus, the antennas being available for the communications between the user equipment terminal and the base station apparatus. In the system, in a case where different signals are transmitted using four antennas of the base station apparatus but only two antennas of the user equipment terminal can be used, the user equipment terminal may not adequately demodulate the downlink signals. Therefore, in cells where communications using plural antennas are permitted, it may be desired that at least information that is basically required for the communications is reliably transmitted regardless of the number of the transmission antennas of the base station apparatus and the number of the reception antennas of the user equipment terminal. Especially, the Primary Broadcast Channel (P-BCH) includes important information items indicating such as a system bandwidth and a transmission power value of a downlink reference signal; therefore, it is desired that the user equipment (UE) terminal can reliably receive the Primary Broadcast Channel (P-BCH) as soon as a cell search is performed. However, it is not yet determined how the signals including the Primary Broadcast Channel (P-BCH) are to be transmitted in a future system in the LTE system and further discussion is required on this issue.

According to an embodiment of the present invention, even when the number of transmission antennas of the base station apparatus is unknown, the user equipment (UE) terminal may adequately receive primary broadcast information.

Means for Solving the Problems

According to an aspect of the present invention, there is provided a base station apparatus in a mobile communication system allowing for user equipment terminals having different numbers of receiving antennas. The base station apparatus includes a mapping unit mapping a reference signal, a primary broadcasting signal, a synchronization signal, and an L1/L2 control signal onto a predetermined signal format and a transmission unit transmitting the mapped signals. Further, within a sub-frame, the mapping unit maps (a) the L1/L2 control signal and the primary broadcasting signal so as to be time-domain multiplexed, maps (b) the primary broadcasting signal and the synchronization signal within a predetermined bandwidth in a middle of a system bandwidth, maps (c) a reference signal included in a predetermined transmission stream within the predetermined bandwidth, but does not map a reference signal included in a transmission stream other than the predetermined transmission stream within the predetermined bandwidth.

Advantageous Effect of the Invention

According to an embodiment of the present invention, even when the number of transmission antennas of the base station apparatus is unknown, the user equipment (UE) terminal may adequately receive primary broadcast information.

EXPLANATION OF REFERENCES

50: CELL
$100_1$, $100_2$, $100_3$, $100_n$: USER EQUIPMENT TERMINAL(S) (MOBILE STATION(S))
102: TRANSMISSION/RECEIVING ANTENNA
104: AMPLIFIER
106: TRANSMISSION/RECEIVING SECTION
108: BASEBAND SIGNAL PROCESSING SECTION
110: APPLICATION SECTION
1081: LAYER 1 PROCESSING SECTION
1082: MAC PROCESSING SECTION
200: BASE STATION APPARATUS
202: TRANSMISSION/RECEIVING ANTENNA
204: AMPLIFIER
206: TRANSMISSION/RECEIVING SECTION
208: BASEBAND SIGNAL PROCESSING SECTION
210: RADIO RESOURCE MANAGEMENT SECTION
212: TRANSMISSION PATH INTERFACE
2081: LAYER 1 PROCESSING SECTION
2082: MAC PROCESSING SECTION
2083: RLC PROCESSING SECTION
2084: BROADCAST INFORMATION GENERATION SECTION
300: ACCESS GATEWAY APPARATUS
400: CORE NETWORK

BEST MODE FOR CARRYING OUT THE INVENTION

Figure 1:
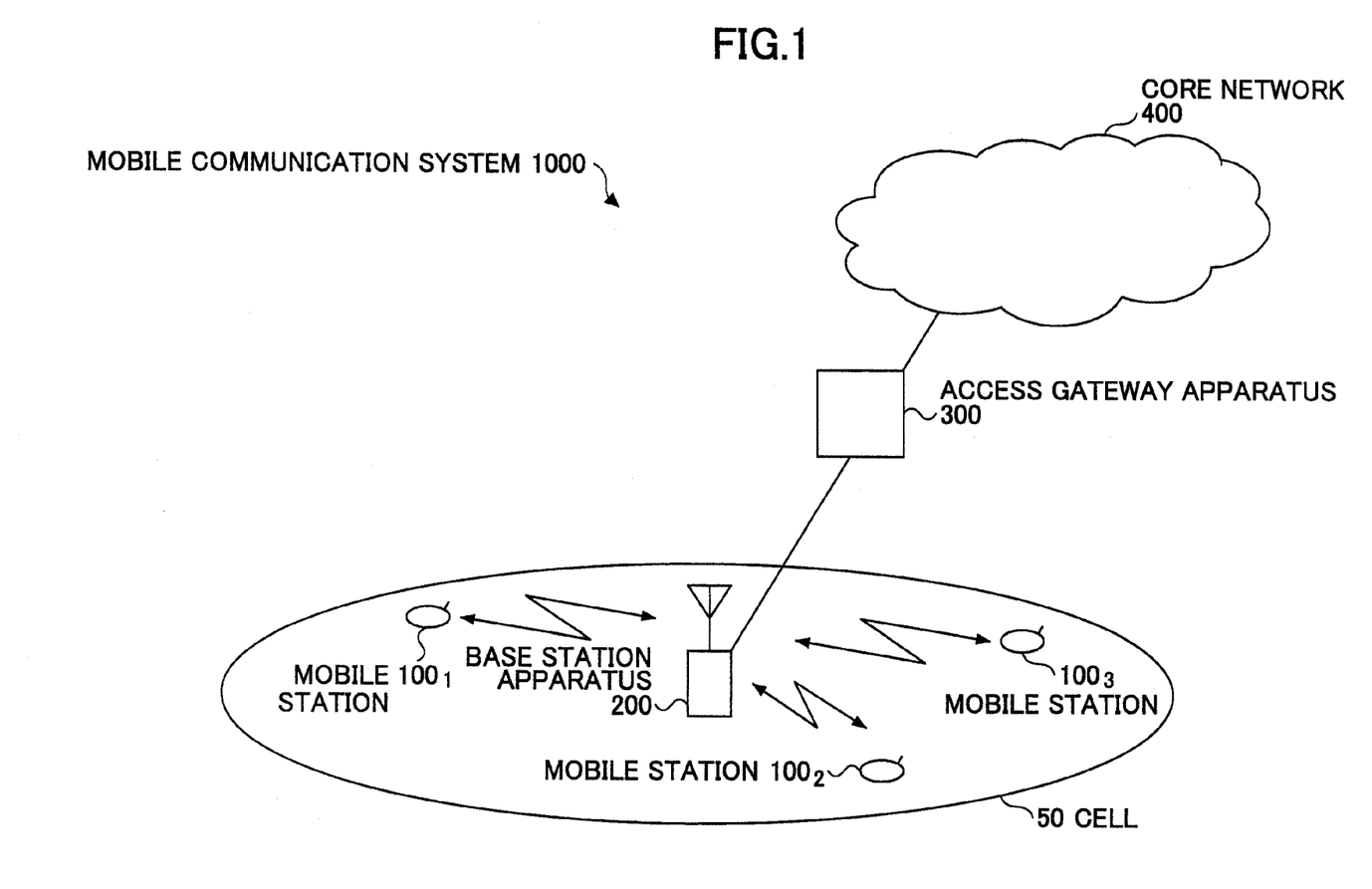
FIG. 1 is a schematic drawing showing a mobile communication system according to an embodiment of the present invention.

For explanatory purposes, the present invention is described by being divided into several embodiments. However, the division of the present invention into several embodiments is not an essential element of the present invention. For example, the embodiments may be combined on an as-needed basis.
First Embodiment
System Summary
FIG. 1 schematically shows a mobile communication system 1000 according to an embodiment of the present invention. As shown in FIG. 1, the mobile communication system 1000, which may be an LTE (Long Term Evolution) system (or may be an Evolved UTRA (Universal Terrestrial Radio Access) and UTRAN (UTRA Network) system or a super 3G system), includes a base station apparatus (eNB: eNode B) 200 and plural mobile stations (user equipment (UE)) 100$_n$ (100$_1$, 100$_2$, 100$_3$, ... 100$_n$; n: an integer greater than zero (0)) (hereinafter, the user equipment (UE) may be referred to as a user equipment (UE) terminal(s)). The base station apparatus 200 is connected to an upper node station such as an access gateway apparatus or a mobility management node (MME/UPE) 300. The access gateway apparatus 300 is connected to a core network 400. In this case, the user equipment (UE) terminals 100$_n$ are in communication with the base station apparatus 200 in a cell 50 based on the LTE system scheme. For explanatory purposes, it is mobile stations that communicate with the base station apparatus. However, more generally, the term user equipment (UE) (terminals) including moving terminals and fixed terminals may also be used as a substitute for the mobile stations.

Base Station Apparatus

Figure 2:
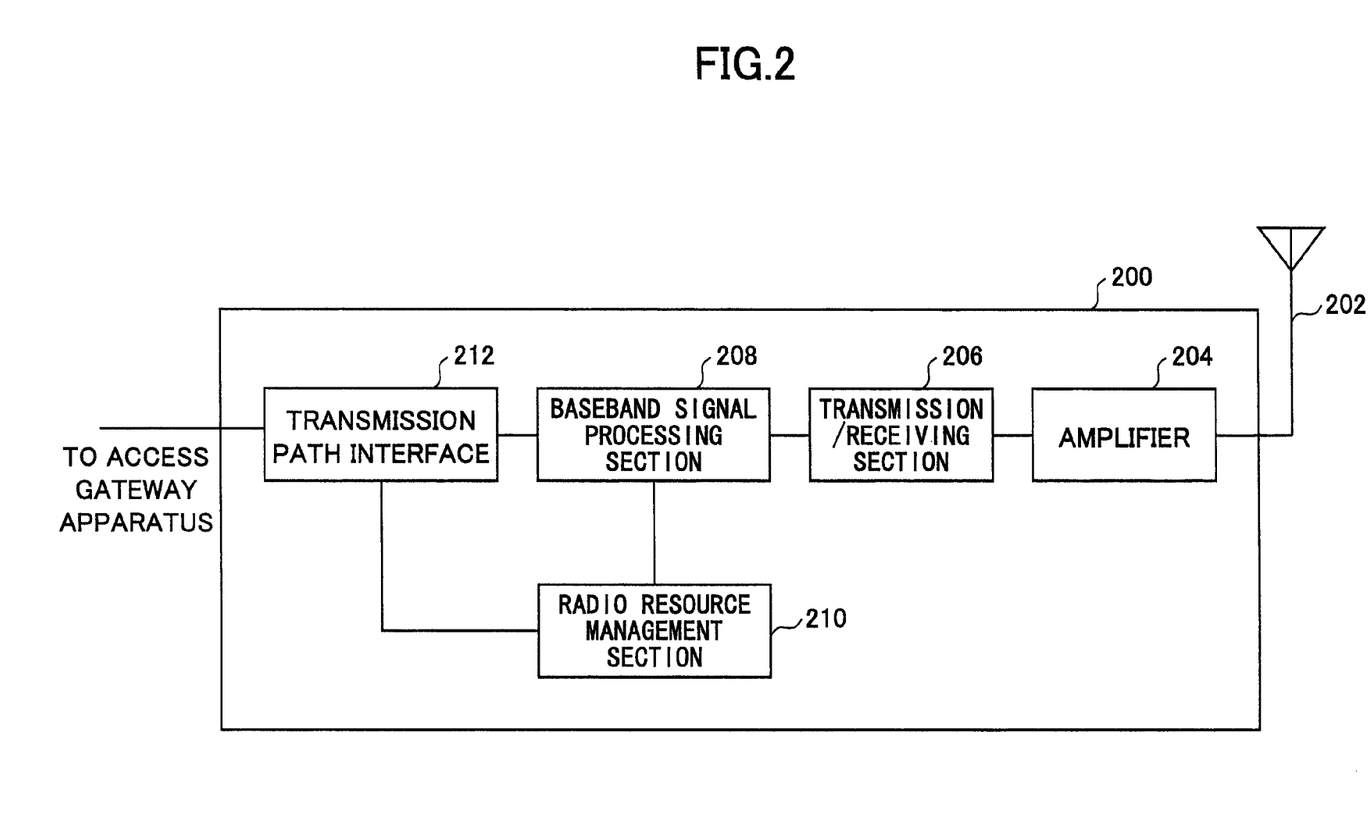
FIG. 2 is a partial block diagram of a base station apparatus according to an embodiment of the present invention.

FIG. 2 shows an exemplary configuration of the base station apparatus 200 (in FIG. 1) according to an embodiment of the present invention. As shown in FIG. 2, the base station apparatus 200 includes a transmission/receiving antenna 202, an amplifier 204, a transmission/receiving section 206, a baseband signal processing section 208, a radio resource management section 210, and a transmission path interface section 212. For simplification purposes, only one transmission/receiving antenna 202 is described in FIG. 2; however, plural antennas are actually provided. In this embodiment of the present invention, it is assumed that first through fourth streams are transmitted via first through fourth transmission/receiving antennas. In the following, for explanatory purposes, a downlink process (1) and an uplink process (2) are separately described.

First, in the downlink process (1) where user data are transmitted from the base station apparatus 200 to the user equipment (UE) terminals 100$_n$, the user data are transmitted from a higher station (e.g., the MME/UPE or the access gateway apparatus 300) located at a higher level than the base station apparatus 200 to the baseband signal processing section 208 via the transmission path interface section 212 of the base station apparatus 200. In the baseband signal processing section 208, segmentation and concatenation of the user data, an RLC-layer transmission processes such as RLC (Radio Link Control) retransmission control, MAC (Medium Access Control) retransmission control, such as an HARQ (Hybrid Automatic Repeat reQuest) transmission process, a scheduling process, a transport format selection process, a channel coding process, and an IFFT (Inverse Fast Fourier Transform) process are performed; and the signal processed in the baseband signal processing section 208 is transmitted to the transmission/receiving section 206. Further, with respect to a signal of a Physical Downlink Control Channel (PDCCH) which is a downlink control channel (DL-CCH), the transmission processes such as the channel coding, the IFFT and the like are performed; and the processed signal is transmitted to the transmission/receiving section 206. In the transmission/receiving section 206, a frequency conversion process is performed so that the baseband signal output from the baseband signal processing section 208 is converted into a signal in a radio-frequency band. Then the converted signal is amplified by the amplifier 204 and transmitted via the transmission/receiving antenna 202.

On the other hand, in the uplink process (2) where data are transmitted from the user equipment (UE) terminals 100$_n$ to the base station apparatus 200, a signal in the radio frequency is received by the transmission/receiving antenna 202, amplified by the amplifier 204, frequency-converted by the transmission/receiving section 206, and input into the baseband signal processing section 208 of the base station apparatus 200. In the baseband signal processing section 208, with respect the user data included in the input baseband signal, an FFT (Fast Fourier Transform) process, an error correction decoding process, a reception process of the MAC retransmission control, and a reception process of the RLC layer data are performed; and the processed signal is transmitted to the access gateway apparatus 300 via the transmission path interface section 212.

The radio resource management section 210 performs call processes such as setting and releasing a communication channel, management of the base station apparatus 200, and management of radio resources.

Figure 3:
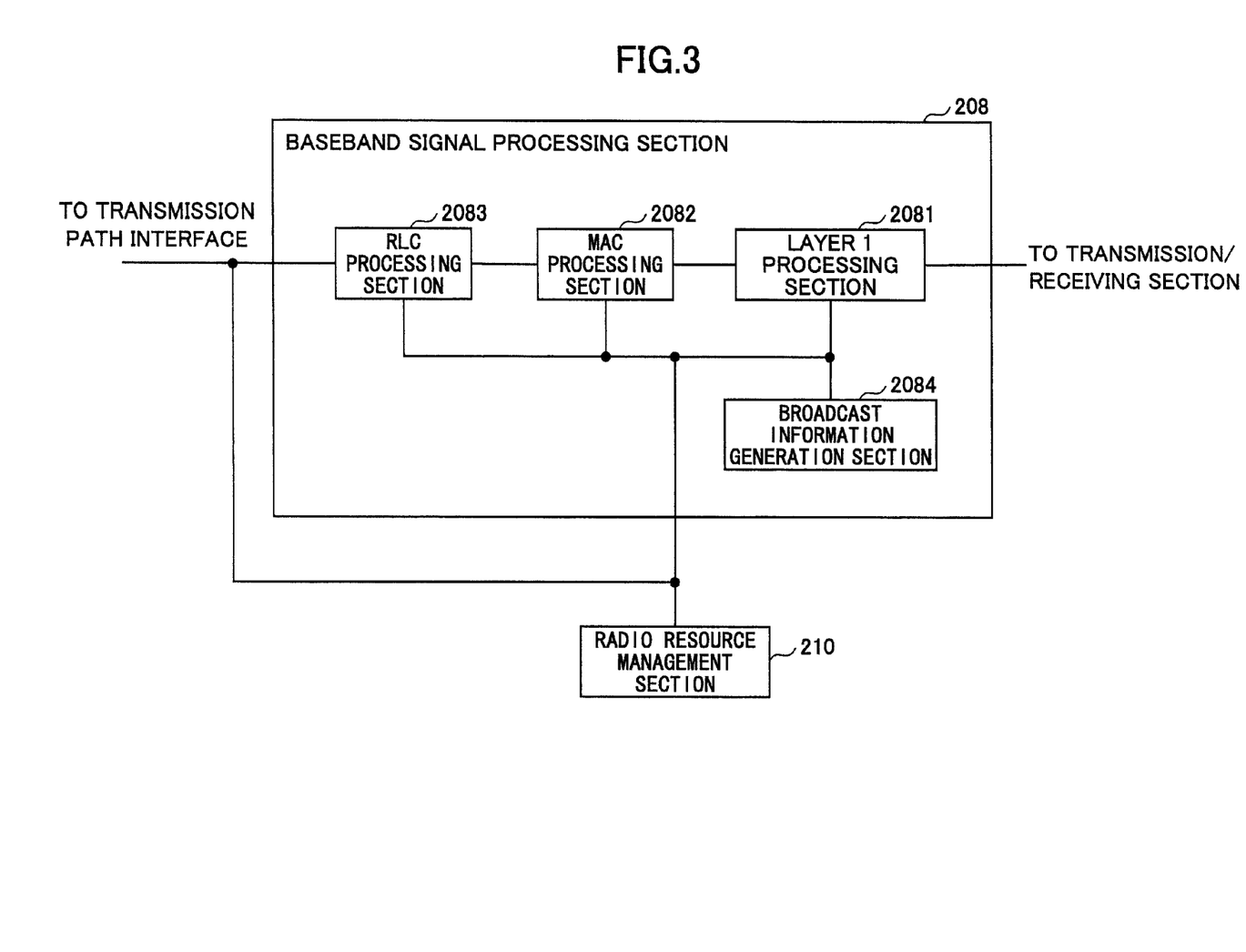
FIG. 3 is a partial block diagram of a baseband signal processing section of the base station apparatus of FIG. 2.

FIG. 3 illustrates an exemplary configuration of the baseband signal processing section 208.

As shown in FIG. 3, the baseband signal processing section 208 includes a layer 1 processing section 2081, a MAC processing section 2082, an RLC processing section 2083, and a broadcast information generation section 2084.

In the RLC processing section 2083, with respect to the downlink packet data, the RLC-layer transmission process such the segmentation and concatenation and the transmission process of the RLC retransmission control data are performed. Further, in the RLC processing section 2083, with respect to the uplink packet data, the RLC-layer reception processes such as the segmentation and concatenation and the reception process of the RLC retransmission control data are performed.

The MAC processing section 2082 performs the MAC retransmission control, such as the HARQ transmission process, the scheduling process, the transport format selection process, and a frequency resources allocation process with respect to the downlink user data. In this case, the scheduling process refers to a process of selecting a user equipment (UE) terminal to receive user data using the downlink shared channel (DL-SCH) in a sub-frame. The transport format selection process refers to a process of determining the modulation scheme, the coding rate, and the data size of the user data transmitted by the user equipment (UE) terminal selected in the scheduling process. The determination of the modulation scheme, coding rate, and data size may be performed based on, for example, a value of CQI (Channel Quality Indicator) reported from the user equipment (UE) terminals in uplink. The frequency resources allocation process refers to a process of determining resource blocks to be used for the transmission of the user data received by the user equipment (UE) terminal selected in the scheduling process. The determination of the resource blocks may be performed based on, for example, the value of CQI reported from the user equipment (UE) terminals in uplink. Further, the MAC processing section 2082 reports the user ID of a user and the information of the transport format of the data of the user (user data) to the layer 1 processing section 2081, the user being in communication using the Physical Downlink Shared Channel (PD-SCH) determined in the above various processes (i.e., the scheduling process, the transport format selection process, and the frequency resources allocation process).

Further, the MAC processing section 2082 performs the reception process of the MAC retransmission control, the scheduling process, the transport format selection process, and the frequency resources allocation process with respect to the uplink user data. In this case, the scheduling process refers to a process of selecting a user equipment (UE) terminal that transmits the user data using a shared channel in a sub-frame. The transport format selection process refers to a process of determining the modulation scheme, the coding rate, and the data size of the user data transmitted by the user equipment (UE) terminal selected in the scheduling process. The determination of the modulation scheme, coding rate, and data size may be performed based on, for example, a value of SIR (Signal-to-Interference power Ratio) of a Sounding reference signal transmitted from the user equipment (UE) terminal in uplink. The frequency resources allocation process refers to a process of determining resource blocks to be used for the transmission of the user data transmitted by the user equipment (UE) terminal selected in the scheduling process. The determination of the resource blocks may be performed based on, for example, the value of the SIR of the Sounding reference signal transmitted from the user equipment (UE) terminal in uplink. Further, the MAC processing section 2082 reports the user ID of the user and the information of the transport format of the data of the user (user data) to the layer 1 processing section 2081, the user being in communication using the Physical Uplink Shared Channel (PUSCH) determined in the above various processes (i.e., the scheduling process, the transport format selection process, and the frequency resources allocation process).

The layer 1 processing section 2081 performs the channel coding, the IFFT process and the like with respect to the data transmitted in downlink and the channel decoding, the FFT process and the like with respect to the data received in uplink. In this case, the data transmitted (in downlink) and the data received (in uplink) may include, for example, the IP packet data transmitted/received by Web browsing, FTP (File Transfer Protocol), Voice packet data (VoIP) and a control signal for the process of RRC (Radio Resource Control). Further, the name of the user data as a logical channel may be, for example, a DTCH (Dedicated Traffic Channel) or a DCCH (Dedicated Control Channel).

The layer 1 processing section 2081 receives the Downlink Scheduling Information (including the user ID of the user to perform communications using the Physical Downlink Shared Channel (PDSCH), the information of the transport format of the user data and the like) and the Uplink Scheduling Grant (including the user ID of the user to perform communications using the Physical Uplink Shared Channel (PUSCH), the information of the transport format of the user data and the like) from the MAC processing section 2082. Further, the layer 1 processing section 2081 performs the transmission processes such as the channel coding process and the IFFT process with respect to the received downlink and uplink scheduling information. The scheduling information for downlink and for uplink is mapped to the Physical Downlink Control Channel (PDCCH) which is a downlink control channel (DL-CCH). Downlink reference signals may be received in transmission diversity mode. In this case, any transmission diversity method which is adequate and known in the art may be used. For example, the Cyclic Delay Diversity (CDD) method, the Frequency Switched Transmit Diversity (FSTD) method, the Space Frequency Block Coding (SFBC) method, the Space Time Block Coding (STBC) method and the like may be used. In the embodiment of the present invention, the transmission diversity based on the Space Frequency Block Coding (SFBC) method is performed. The layer 1 processing section 2081 receives broadcast information from the broadcast information generation section 2084 and performs the transmission processes such as the channel coding process and the IFFT process and the like on the received broadcast information.

The broadcast information generation section 2084 generates the broadcast information to be broadcasted to the users (user equipment (UE) terminals) in the cell. The broadcast information may includes information items indicating, for example, the system bandwidth, the transmission power value of the downlink reference signal, the sub-fame to be used for the transmission of the MBMS data, an interference amount in uplink, a Physical Random Access Channel (PRACH) and the like. Further, the broadcast information may include primary broadcast information (i.e., P-BCH) and secondary broadcast information (i.e., S-BCH). The primary broadcast information (P-BCH) includes the layer 1 information to be received by the user equipment (UE) terminal as soon as the cell search is performed; and, further, the information items indicating the system bandwidth, the transmission power value of the downlink reference signal and the like correspond to the primary broadcast information (P-BCH). The primary broadcast information (P-BCH) is transmitted via the Common Control Physical Channel (CCPCH), and, on the other hand, the secondary broadcast information (S-BCH) is transmitted via the Physical Downlink Shared Channel (PDSCH).

Examples of Signal Mapping

Figure 4:
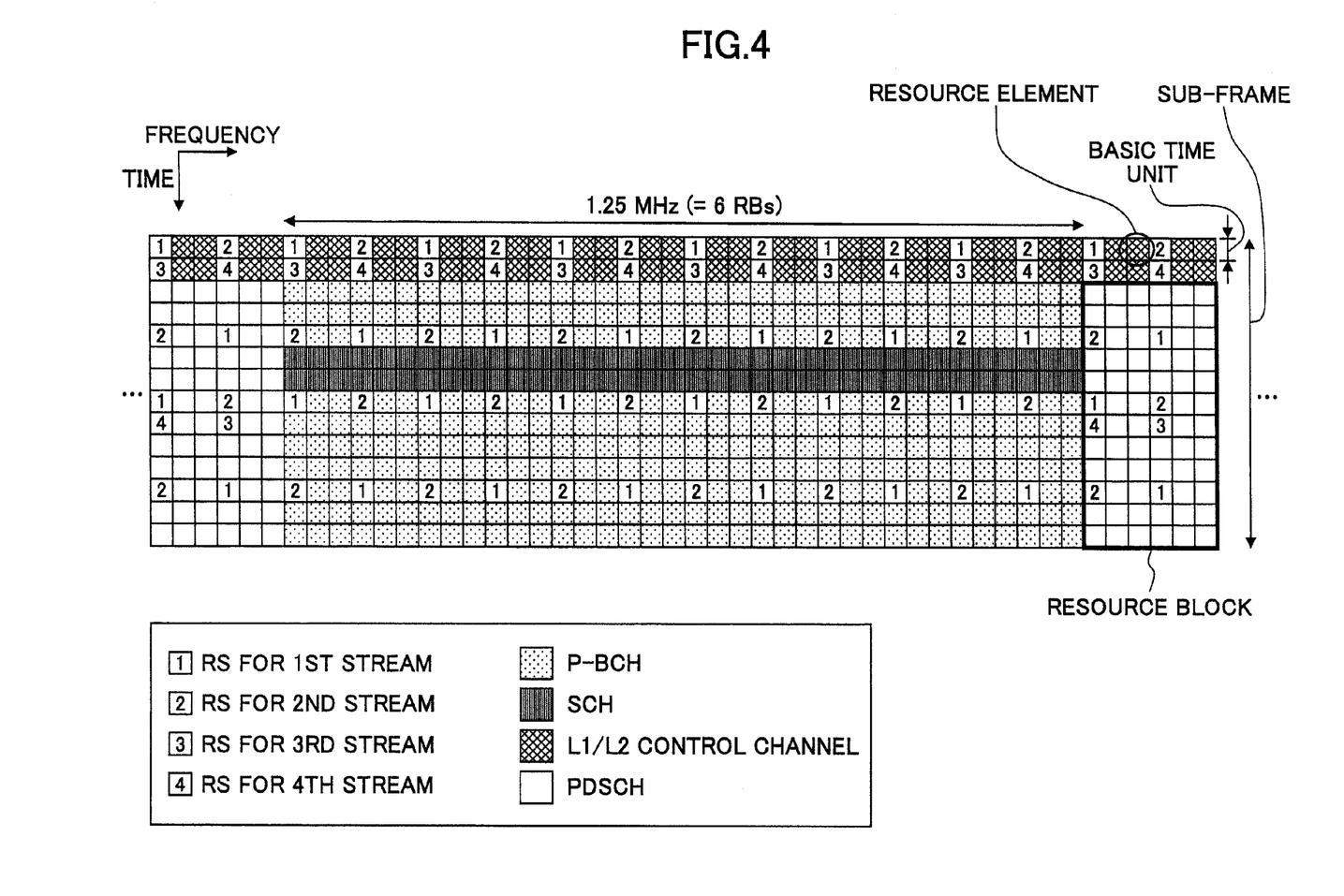
FIG. 4 is a drawing showing an example of signal mapping performed by a layer 1 processing section.

FIG. 4 shows an example of signal mapping performed by the layer 1 processing section 2081. The mapping example of FIG. 4 shows a case where a signal to be transmitted is mapped in a period of one sub-frame (having, for example, 1 ms) and in a part of system bandwidth (such as, for example, 5 MHz, 10 MHz, and 20 MHz). The signal may be any adequate downlink signal; and in a case of FIG. 4, Reference Signal (RS), Primary Broadcast Channel (P-BCH), Synchronization Channel (SCH), L1/L2 control channel (L1/L2CCH), and Physical Downlink Shared Channel (PDSCH) are mapped. However, the Primary Broadcast Channel (P-BCH) is not always included in all sub-frames; and the Primary Broadcast Channel (P-BCH) is transmitted to the user at predetermined timing, e.g., once in every ten (10) consecutive sub-frames. Further, it is assumed that the base station apparatus transmits first through fourth streams via four (4) transmission/receiving antennas, and first through fourth reference signals are provided so as to correspond to the first through fourth streams. Further, for simplification purposes of the figures, in FIG. 4, it is assumed that one sub-frame is composed of fourteen (14) basic time units and one resource block is composed of six (6) sub-carriers. However, the values are for illustrative purposes only and any adequate values may be used (e.g., one resource block may be composed of twelve (12) sub-carries). The basic time unit corresponds to a single OFDM symbol. Further, a portion defined by one basic time unit and one sub-carrier may be called a resource element.

The example of signal mapping of FIG. 4 has the following characteristic features.

Feature 1: The Primary Broadcast Channel (P-BCH) is mapped only within a predetermined bandwidth in the middle of the system bandwidth. In FIG. 4, the predetermined bandwidth is 1.25 MHz (composed of six (6) resource blocks); however, any other adequate bandwidth value may be set (used) as long as the bandwidth is equal to or less than the bandwidth that can be received by any user equipment (UE) terminal in the system. The reason the Primary Broadcast Channel (P-BCH) is arranged to be mapped only within a predetermined bandwidth in the middle of the system bandwidth is that this arrangement may allow any user equipment terminal (UE) in the system to receive the Primary Broadcast Channel (P-BCH) regardless of the system bandwidth such as 5 MHz, 10 MHz, 20 MHz or the like.

Feature 2: The L1/L2 control channel (L1/L2CCH) and the Primary Broadcast Channel (P-BCH) are time-domain multiplexed. Generally, the L1/L2 control channel (L1/L2CCH)

is mapped onto one (1), two (2), or three (3) OFDM symbols depending on a value indicated by the "category 0 information (Cat.0)". However, at least within the predetermined bandwidth (1.25 MHz) in the middle of the system bandwidth, it is limited so that the L1/L2 control channel (L1/L2CCH) is mapped onto (occupies) two (2) OFDM symbols; and therefore, the Primary Broadcast Channel (P-BCH) is mapped onto (occupied by) the OFDM symbols other than the two OFDM symbols occupied by the L1/L2 control channel (L1/L2CCH). Due to this limitation (arrangement), it may become possible to keep the number of OFDM symbols onto which the Primary Broadcast Channel (P-BCH) is mapped constant. As a result, it may become possible for the user equipment (UE) terminal to easily detect the locations (in both time and frequency domains) where the Primary Broadcast Channel (P-BCH) is mapped without depending on the category 0 information (Cat.0) (Especially, the locations may be promptly detected after the cell search is performed).

Feature 3: Among the portions (locations) where the L1/L2 control channel (L1/L2CCH) is not mapped, within the predetermined bandwidth (1.25 MHz) in the middle of the system bandwidth, the reference signals related to third and fourth transmission/receiving antennas are not mapped. In other words, it is prohibited to map the reference signals related to third and fourth transmission/receiving antennas onto the portions (resource elements) where the Primary Broadcast Channel (P-BCH) may be mapped. Conversely, the reference signals related to third and fourth transmission/receiving antennas are mapped onto the portions (resource elements) where the Primary Broadcast Channel (P-BCH) is never mapped. Due to this prohibition (limitation), it may become possible for a user equipment (UE) terminal that can receive the Primary Broadcast Channel (P-BCH) by using only two antennas to reliably demodulate the Primary Broadcast Channel (P-BCH).

Feature 4: The bandwidth occupied by the Primary Broadcast Channel (P-BCH) is the same as that occupied by a Synchronization Channel (SCH). In the example of FIG. 4, each of the Primary Broadcast Channel (P-BCH) and the Synchronization Channel (SCH) occupies 1.25 MHz in the middle of the system bandwidth. By doing this, it may make it easier to detect the Primary Broadcast Channel (P-BCH) similar to the detection of the Synchronization Channel (SCH) in the cell search.

The signal format (signal mapping) of FIG. 4 has the above-described features; and therefore, it may become possible for the user equipment (UE) terminal to reliably receive the Primary Broadcast Channel (P-BCH) as soon as the cell search is performed without the category 0 information (Cat.0) and the information items indicating the system bandwidth, the number of transmission antennas and the like.

As described above, generally, the L1/L2 control channel (L1/L2CCH) is mapped onto one (1), two (2), or three (3) OFDM symbols depending on a value indicated by category 0 information (Cat.0). Therefore, when the limitation described in the above feature 2 is applied (imposed), there may be several choices for a mapping method of the L1/L2 control channel (L1/L2CCH) as described below.

Figure 5:
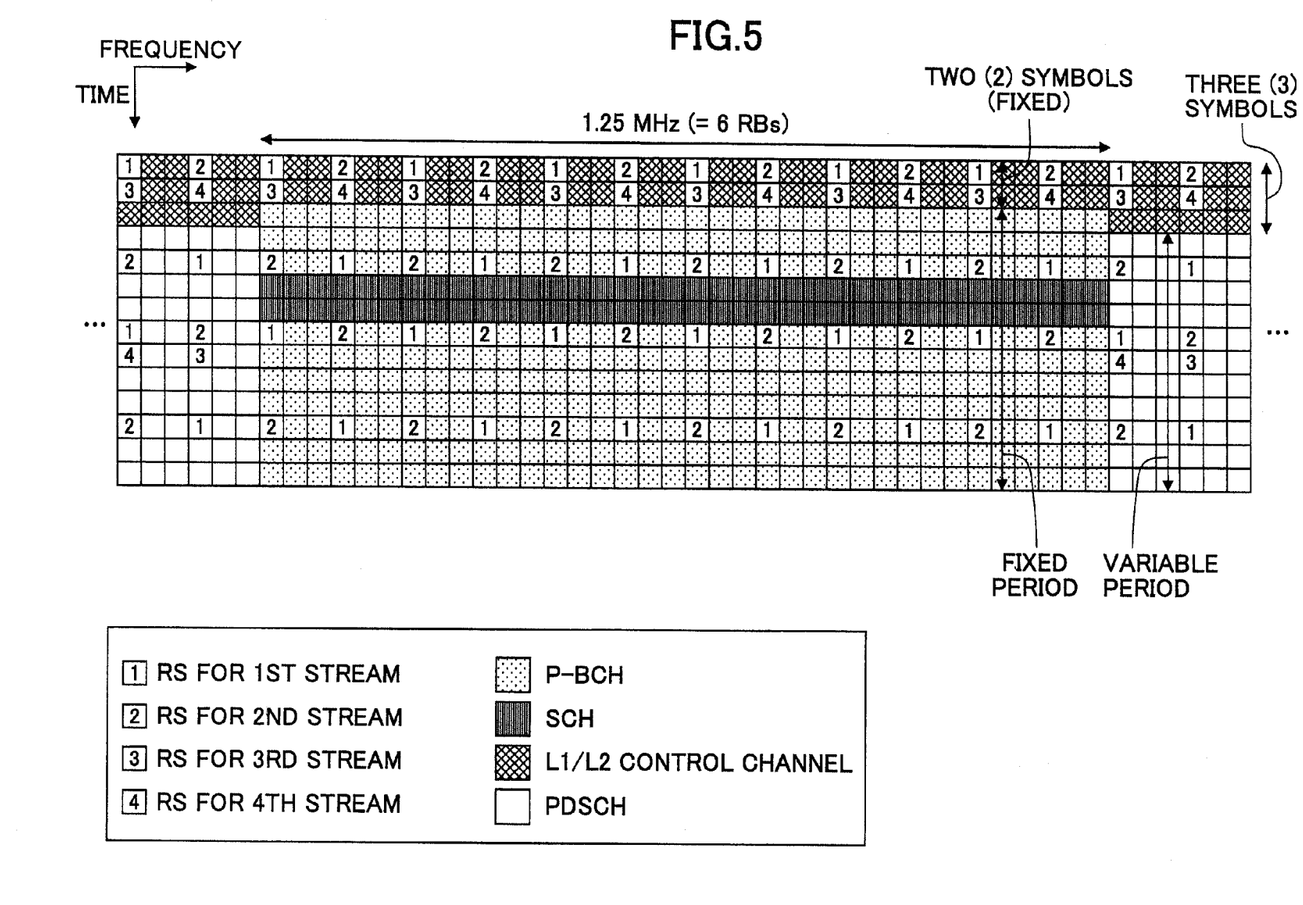
FIG. 5 is a drawing showing another example of signal mapping where an L1/L2 control channel is mapped in different manners between within and outside of a predetermined area.

FIG. 5 shows one of the choices for the mapping method of the L1/L2 control channel (L1/L2CCH). As shown in FIG. 5, the number of the OFDM symbols where the L1/L2 control channel (L1/L2CCH) is mapped within the bandwidth (1.25 MHz) in the middle of the system bandwidth may be different from the number of the OFDM symbols where the L1/L2 control channel (L1/L2CCH) is mapped outside the bandwidth (1.25 MHz) in the middle of the system. In the example of FIG. 5, the L1/L2 control channel (L1/L2CCH) is mapped onto two (2) OFDM symbols within the 1.25 bandwidth and is mapped onto three (3) OFDM symbols in the bandwidths other than (outside) the 1.25 bandwidth.

Figure 6:
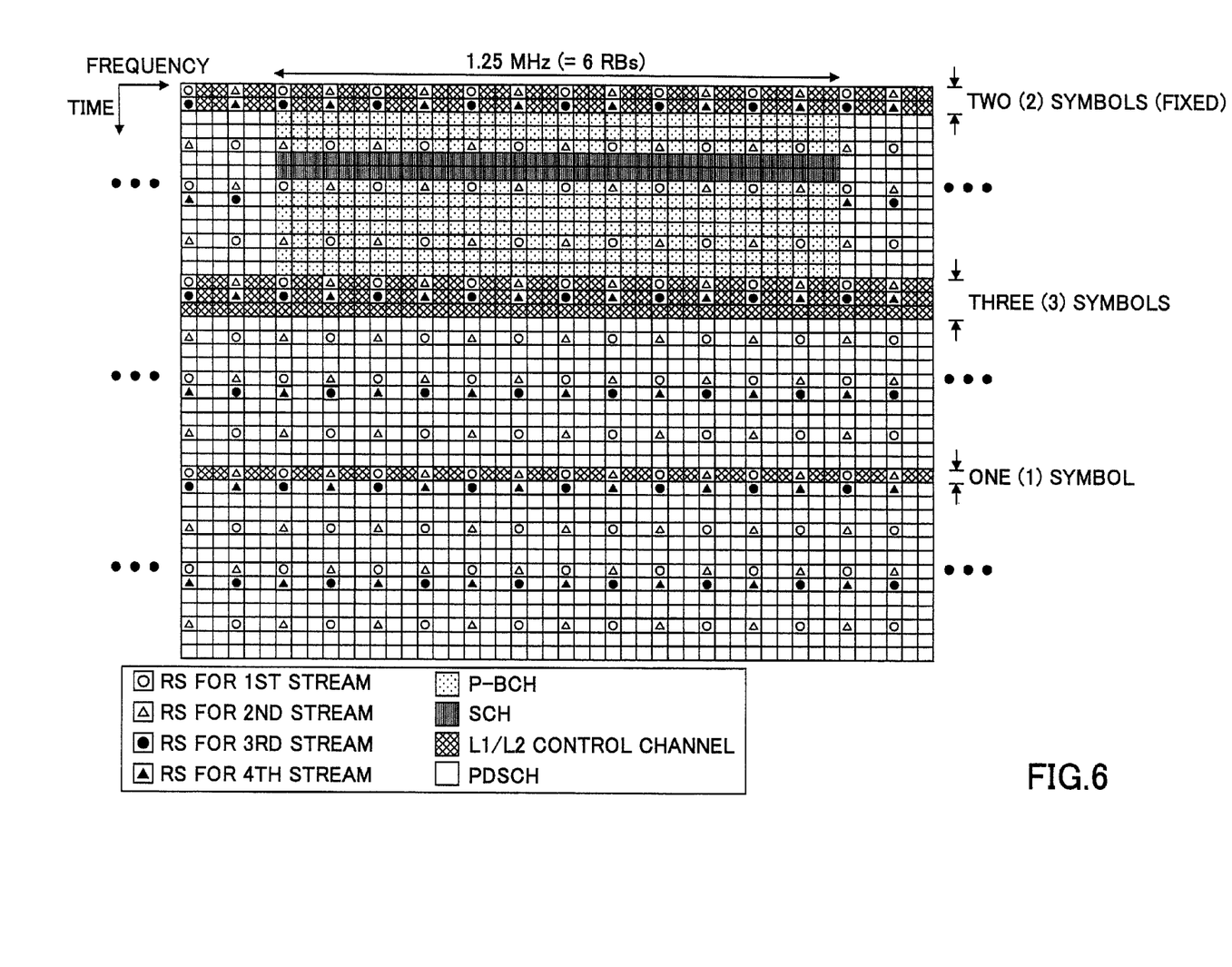
FIG. 6 is a drawing showing still another example of signal mapping.

FIG. 6 shows another choice for the mapping method of the L1/L2 control channel (L1/L2CCH). As shown in FIG. 6, in the sub-frame where the Primary Broadcast Channel (P-BCH) is mapped, the L1/L2 control channel (L1/L2CCH) is mapped onto two (2) OFDM symbols without fail. On the other hand, in the sub-fames where no Primary Broadcast Channel (P-BCH) is mapped, the L1/L2 control channel (L1/L2CCH) is mapped onto one (1), two (2), or three (3) OFDM symbols depending on the value indicated by category 0 information (Cat.0). In the example of FIG. 6, the L1/L2 control channel (L1/L2CCH) is mapped onto two (2) OFDM symbols in the sub-frame where the Primary Broadcast Channel (P-BCH) is mapped, three (3) OFDM symbols in the next sub-frame, and one (1) OFDM symbol in the second next sub-frame.

User Equipment (UE) Terminal

Figure 7:
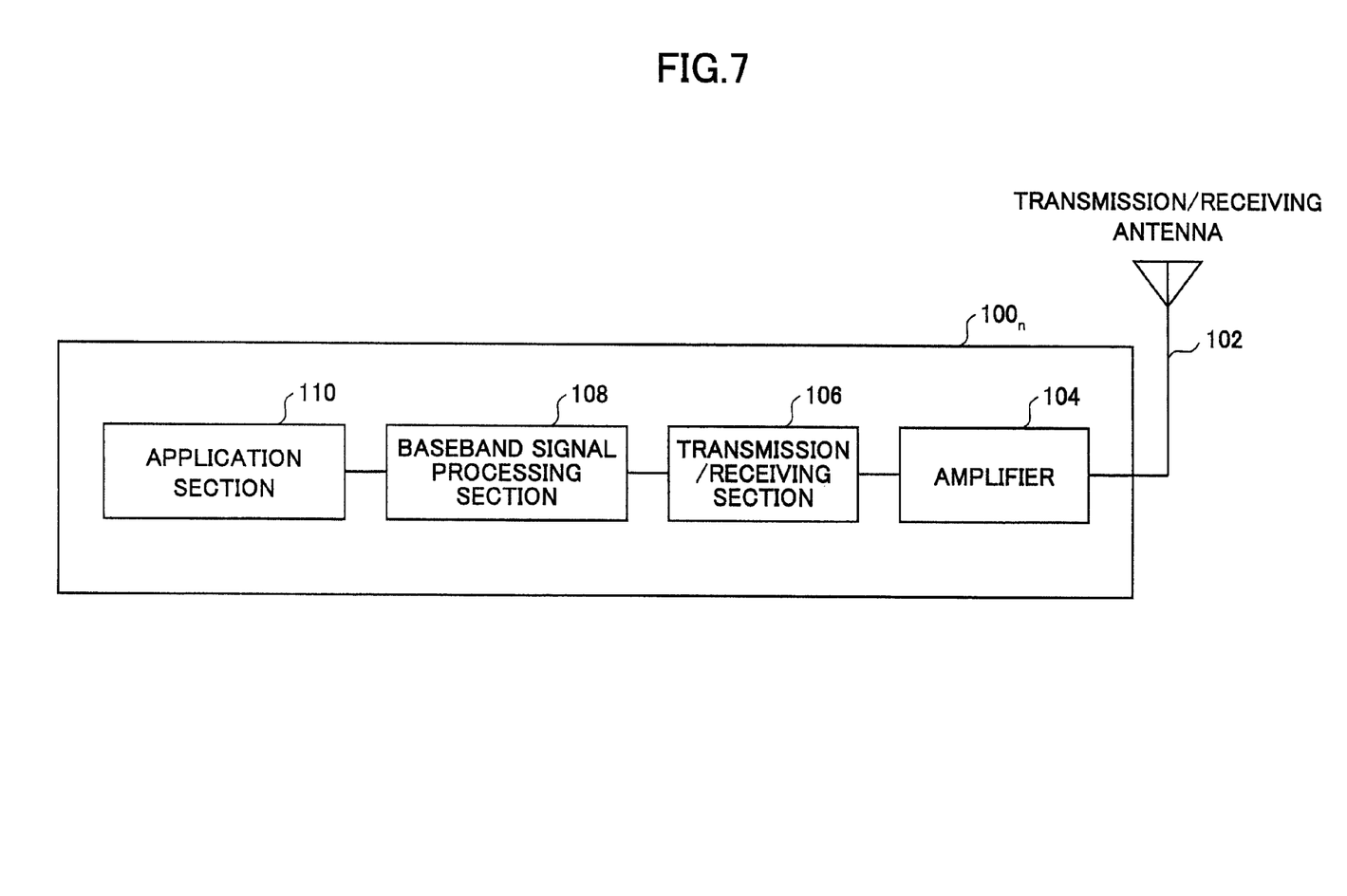
FIG. 7 is a partial block diagram showing a user equipment (UE) terminal according to an embodiment of the present invention.

FIG. 7 shows an exemplary configuration of the user equipment (UE) terminal $100_n$ according to an embodiment of the present invention. As shown in FIG. 7, the user equipment (UE) terminal $100_n$ includes a transmission/receiving antenna 102, an amplifier 104, a transmission/receiving section 106, a baseband signal processing section 108, and an application section 110. Similar to the case of the base station apparatus in FIG. 2, only one transmission/receiving antenna 202 is described in FIG. 4; however, plural antennas are actually provided.

With respect to downlink data, a radio-frequency signal received by the transmission/receiving antenna 102 is amplified by the amplifier 104 and frequency-converted into a baseband signal by the transmission/receiving section 106. With respect to the converted baseband signal, the baseband signal processing section 108 performs the FFT process, the error correction decoding process, a reception process of retransmission control and the like. The downlink user data included in the downlink data are transmitted to the application section 110. The application section 110 performs processes regarding a layer higher than the Physical layer and the MAC layer and the like. Further, the broadcast information included in the downlink data is also transmitted to the application section 110.

On the other hand, the uplink user data are input (transmitted) from the application section 110 to the baseband signal processing section 108. The baseband signal processing section 108 performs the transmission process of the retransmission control (HARQ), the channel coding process, the IFFT process and the like on the user data and transmits the processed user data (baseband signal) to the transmission/receiving section 106. The transmission/receiving section 106 performs a frequency-conversion process converting the baseband signal output from the baseband signal processing section 108 into a signal in a radio-frequency band. Then the converted signal in the radio-frequency band is amplified by the amplifier 104 and transmitted via the transmission/receiving antenna 102.

Figure 8:
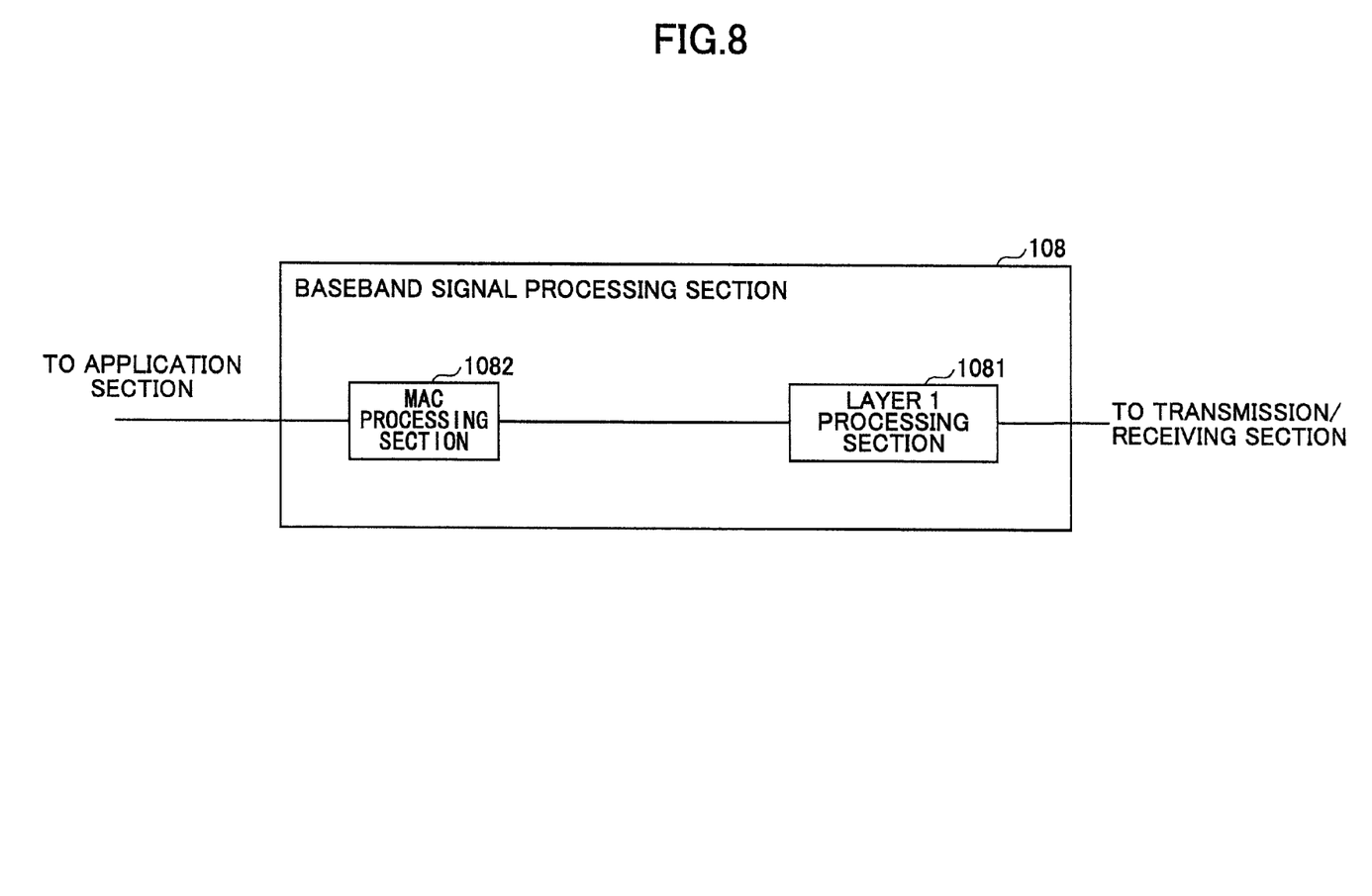
FIG. 8 is a partial block diagram of a baseband signal processing section of the user equipment (UE) terminal of FIG. 7.

FIG. 8 shows an exemplary configuration of the baseband signal processing section 108. As shown in FIG. 8, the baseband signal processing section 108 includes a layer 1 processing section 1081 and a MAC processing section 1082.

The layer 1 processing section 1081 generally receives the downlink L1/L2 signal, performs the demodulation process and the decoding process on the received downlink L1/L2 signal, and transmits the demodulated and the decoded result (signal) to the MAC processing section 1082. When the transmission diversity is performed on the downlink reference signal or the like, the corresponding reception diversity is performed so as to be in accordance with the transmission diversity performed in the base station apparatus. The layer 1 processing section 1081 performs a process of separating the signals mapped as shown in FIG. 4.

To transmit the user data in uplink using a sub-frame, the layer 1 processing section 1081 first receives the user data from the MAC processing section 1082. Then, with respect to the received user data, the layer 1 processing section 1081 performs processes such as the coding process, the data modulation process, a DFT (Discrete Fourier Transformation) process, a sub-carrier mapping process, the IFFT process and the like, converts the processed user data into a baseband signal, and transmits the baseband signal to the transmission/receiving section 106. Upon transmitting the control channel in uplink in a sub-frame, with respect to the control signal (such as the CQI or acknowledgement information) to be transmitted, the layer 1 processing section 1081 performs processes such as the channel coding process, the data modulation process, the DFT process, the sub-carrier mapping process, the IFFT process and the like to convert the signal into a baseband signal, and transmits the converted baseband signal to the transmission/receiving section 106.

The MAC processing section 1082 performs the reception processes of the MAC retransmission control of the downlink user data based on the decoding result of the Physical Downlink Control Channel (PDCCH) received from the layer 1 processing section 1081. Namely when it is reported that, in downlink, the communications using the shared channel are to be performed, the MAC processing section 1082 performs the decoding and the CRC (Cyclic Redundancy Check) on the received user data to determine whether the signal of the user data has an error. Then, based on a result of the CRC, the MAC processing section 1082 generates the acknowledgement information and reports the generated acknowledgement information to the layer 1 processing section 1081. When determining that the result of the CRC is affirmative, the MAC processing section 1082 generates an affirmative response signal "ACK" as the acknowledgement information, and on the other hand; and when determining that the result of the CRC is negative, the MAC processing section 1082 generates a negative response signal "NACK" as the acknowledgement information.

Based on the result of the decoded Uplink Scheduling Grant included in the Physical Downlink Control Channel (PDCCH) received from the layer 1 processing section 1081, the MAC processing section 1082 determines the transport format of the uplink user data and performs the transmission processes such as the retransmission control in the MAC layer and the like. Namely, when the information indicating the permission to perform the communications using the shared channel in uplink is transmitted via the Physical Downlink Control Channel (PDCCH) received from the layer 1 processing section 1081, with respect to the user data to be transmitted, the MAC processing section 1082 determines the transport format, performs the transmission processes such as the retransmission control and the like, and transmits the processed user data to the layer 1 processing section 1081.

Second Embodiment

In a second embodiment of the present invention, as described in the first embodiment, it is assumed that first through fourth streams are transmitted via first through fourth transmission/receiving antennas.

Figure 9:
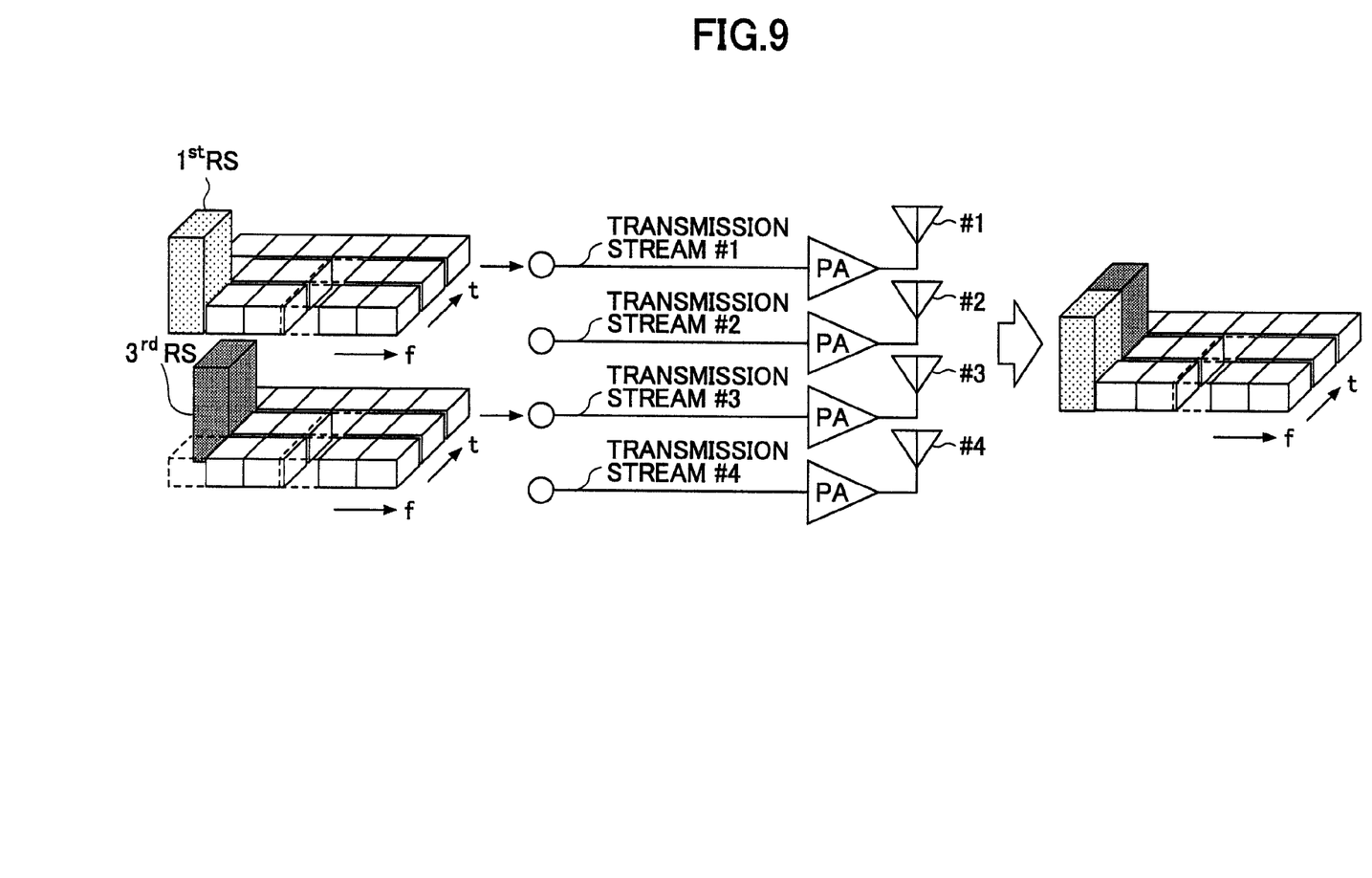
FIG. 9 is a drawing showing where transmission antennas are provided so as to correspond to streams.

FIG. 9 is a drawing showing a case where one stream corresponds to one transmission/receiving antenna and the signals mapped as shown in the left-hand side of the drawing are to be transmitted. In FIG. 9, the vertical axis represents the level of power density. For simplification purposes, in FIG. 9, only signals representing the first stream and the third stream are described. However, it is assumed that actually there are provided signals representing the second stream and the fourth stream. Each stream is input into the corresponding power amplifier (PA), adequately amplified, and then transmitted from the corresponding antenna. Reference signals indicated as $1^{st}$ RS, $2^{nd}$ RS, $3^{rd}$ RS, and $4^{th}$ RS are associated with the first, second, third, and fourth streams, respectively, and may be included in the first, second, third, and fourth streams, respectively, on an as-needed basis. In the user equipment (UE) terminal, a channel compensation process and a received quality measurement process and the like may be performed based on the reference signals. Therefore, it is important that the reference signal can be adequately (reliably) received. To that end, the power density value of the reference signal is generally set higher than that of any other signal as shown in FIG. 9.

On the other hand, as shown in FIG. 4 and the like, the reference signal is not included in each OFDM symbol. Therefore, the OFDM symbol (basic time unit) may include the reference signal or may not include the reference signal. This means that the power density value may fluctuate to be large or small. More specifically, the fluctuation of the power density value is large in the OFDM symbol including the reference signal and the fluctuation of the power density value is small in the OFDM symbol not including the reference signal.

Further, the amplification efficiency and the use efficiency of the power amplifiers (PA) in the transmission/receiving antennas may vary depending on the fluctuation of the power density of the input signal. The frequency of the mapping (appearance) of the reference signal is relatively low (for example, the reference signal may be mapped at a rate of one (1) sub-carrier every six (6) sub-carriers). Therefore, when the OFDM symbols including the reference signal are to be transmitted, due to the reference signal having higher power density value and being mapped (appearing) at a low frequency, the use efficiency of the power amplifiers (PA) may be remarkably degraded (reduced).

According to the second embodiment of the present invention, it may become possible to improve the use efficiency of the transmission amplifiers (power amplifiers) provided in the corresponding transmission/receiving antennas of the base station apparatus.

Figure 10:
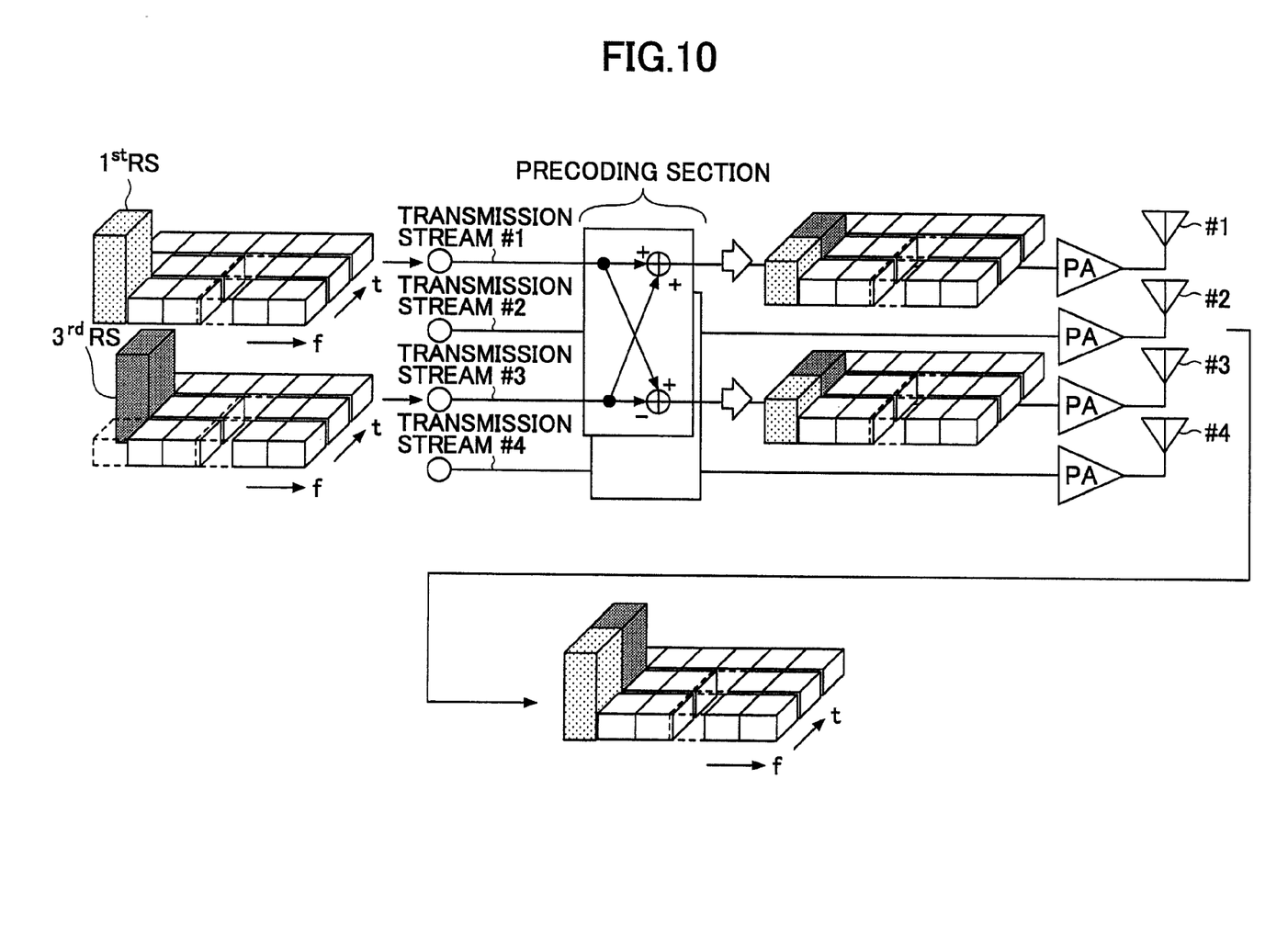
FIG. 10 is a drawing showing where the streams are transmitted after precoding is performed.

FIG. 10 schematically shows a partial configuration of the base station apparatus according to the second embodiment of the present invention. Unlike the case of FIG. 9, the first through fourth streams are precoded in a precoding section and then transmitted via the four (4) transmission/receiving antennas. The precoding section receives plural transmission streams (#1 through #4), duplicates a predetermined number of the transmission streams, weighting-combines the duplicated transmission streams, and outputs plural precoded transmission streams via the plural transmission/receiving antennas. A weighting coefficient or weight to be used for the "weighting" corresponds to a precoding vector. In the example of FIG. 10, the values of the weighting coefficients are±(½). However, any other adequate values may be used. In the example of FIG. 10, the first transmission stream (#1) is transmitted via not only the first transmission/receiving antenna but also the third transmission/receiving antenna. By doing this, the reference signal included in the first transmission stream may be transmitted via the first transmission/receiving antenna and the third transmission/receiving antenna, so that the power density value of each reference signal transmitted via the first transmission/receiving antenna and the third transmission/receiving antenna can be reduced by half compared with the case of FIG. 9. As a result, it may become possible to reduce the fluctuation value of the power density of the signals input to first and third power amplifiers (PA) compared with the case of FIG. 9. Therefore, according to the second embodiment of the present invention, it may become possible to improve the use efficiency of the power amplifiers (PA) by reducing the fluctuation value of the level (power density) of the signals input to the power amplifiers (PA).

In the example of FIG. 10, one transmission stream is duplicated to form two (2) streams so as to be transmitted via two (2) antennas. However, for example, one transmission stream may be duplicated to form four (4) streams so as to be transmitted via four (4) antennas. The greater the number of transmission antennas used for transmitting one transmission stream, the less the fluctuations of the signal values input to the power amplifiers (PA) become.

The present invention is described above by referring to specific embodiments. However, a person skilled in the art may understand that the above embodiments are described for illustrative purpose only and may think of examples of various modifications, transformations, alterations, changes, and the like. To promote an understanding of the present invention, the specific values are used as examples throughout the description. However, it should be noted that such specific values are just sample values unless otherwise described, and any other values may be used. In the above description, the present invention is described as being divided into several embodiments. However, it should be noted that the division of the present invention into several embodiments is not essential to the present invention. For example, two or more embodiments may be combined on an as-needed basis. For illustrative purposes, the apparatus according to an embodiment of the present invention is described with reference to the functional block diagram. However, such an apparatus may be provided by hardware, software, or a combination thereof. The present invention is not limited to the embodiments described above, and various modifications, transformations, alteration, exchanges, and the like may be made without departing from the scope and spirit from the present invention.

The present application is based on and claims the benefit of priority of Japanese Patent Application No. 2007-121305, filed on May 1, 2007, the entire contents of which are hereby incorporated herein by reference.

The invention claimed is:

1. A base station apparatus to be used in a mobile communication system allowing for user equipment terminals having different numbers of receiving antennas, the base station apparatus comprising:
a mapping unit configured to map reference signals, primary broadcasting signals, synchronization signals, and L1/L2 control signals onto a predetermined signal format; and
a transmission unit configured to transmit the mapped signals, wherein within a sub-frame,
the mapping unit is configured to map the L1/L2 control signals and the primary broadcasting signals so that the L1/L2 control signals and the primary broadcasting signals are time-domain multiplexed,
the mapping unit is configured to map all the primary broadcasting signals and the synchronization signals within a predetermined bandwidth in a middle of a system bandwidth, and
the mapping unit is configured to, in one or more OFDM symbols other than one or more OFDM modules where the L1/L2 control signals are mapped, prevent reference signals, which are included in a transmission stream other than a predetermined transmission stream from being allocated within the predetermined bandwidth where the primary broadcasting signals and the synchronization signals are mapped in the middle of the system bandwidth;
wherein a number of Orthogonal Frequency Division Multiplexing (OFDM) symbols to which the L1/L2 control signal is mapped within the predetermined bandwidth in the sub-frame is different from a number of OFDM symbols onto which the L1/L2 control signal is mapped in a bandwidth other than the predetermined bandwidth in the sub-frame.

2. The base station apparatus according to claim 1, wherein the primary broadcasting signal and the synchronization signal occupy a same bandwidth.

3. The base station apparatus according to claim 1, wherein in a bandwidth other than the predetermined bandwidth, both the reference signal included in the predetermined transmission stream and the reference signal included in the transmission stream other than the predetermined transmission stream are mapped.

4. The base station apparatus according to claim 1, wherein a number of Orthogonal Frequency Division Multiplexing (OFDM) symbols onto which the L1/L2 control signal is mapped in the sub-frame is different from a number of OFDM symbols onto which the L1/L2 control signal is mapped in another sub-frame other than the sub-frame.

5. The base station apparatus according to claim 1, further comprising:
a precoding unit configured to duplicate a predetermined number of input transmission streams and apply a precoding vector with respect to the duplicated plural transmission streams to provide plural output transmission streams, wherein a reference signal that is included in one of the input transmission streams and that is to be mapped to a specific resource element is transmitted via plural transmission antennas after the precoding by the precoding unit.

6. A signal transmission method for a base station apparatus in a mobile communication system allowing for user equipment terminals having different numbers of receiving antennas, the method comprising:
a mapping step of mapping reference signals, primary broadcasting signals, synchronization signals, and L1/L2 control signals onto a predetermined signal format;
and
a transmission step of transmitting the mapped signals, wherein within a subframe, in the mapping step,
the L1/L2 control signals and the primary broadcasting signals are mapped so that the L1/L2 control signals and the primary broadcasting signals are time-domain multiplexed, all the primary broadcasting signals and the synchronization signals are mapped within a predetermined bandwidth in a middle of a system bandwidth, and
in one or more OFDM symbols other than one or more OFDM modules where the L1/L2 control signals are mapped, reference signals, which are included in a transmission stream other than a predetermined transmission stream, is prevented from being allocated within the predetermined bandwidth where the primary broadcasting signals and the synchronization signals are mapped in the middle of the system bandwidth;

wherein a number of Orthogonal Frequency Division Multiplexing (OFDM) symbols to which the L1/2 control signal is mapped within the predetermined bandwidth in the sub-frame is different from a number of OFDM symbols onto which the L1/L2 control signal is mapped in a bandwidth other than the predetermined bandwidth in the sub-frame.

* * * * *